Figure 1A:
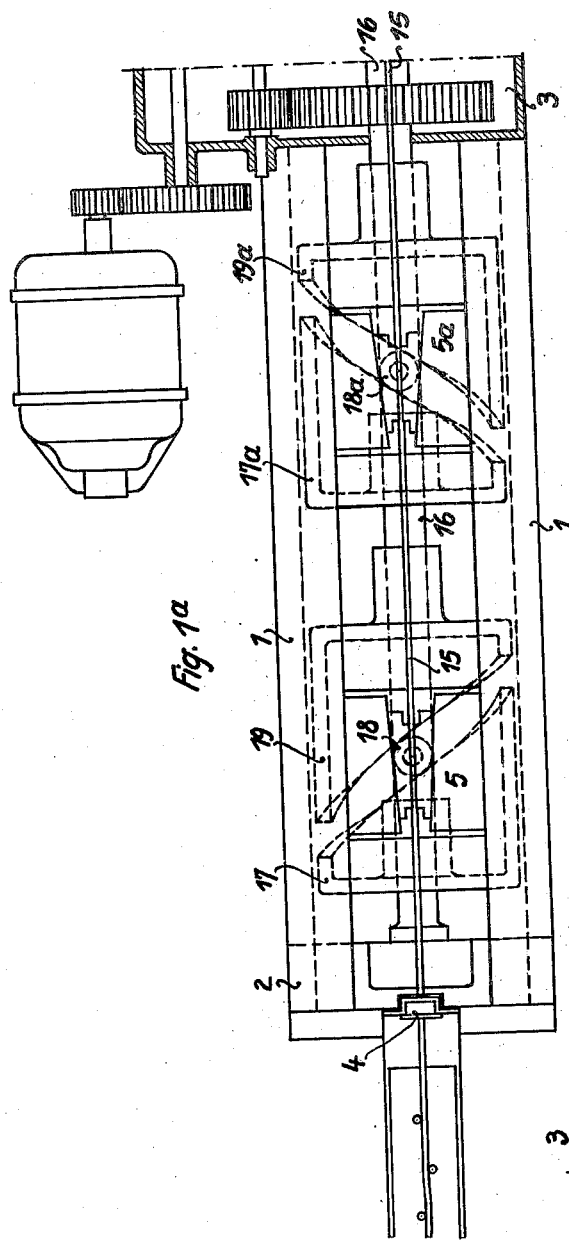

Aug. 14, 1934.  C. THYSSEN  1,970,205
MACHINE FOR DRAWING AND CUTTING STOCK
Filed Sept. 18, 1933   2 Sheets-Sheet 1

Inventor:
Conrad Thyssen
per
Attorney

Aug. 14, 1934.  C. THYSSEN  1,970,205

MACHINE FOR DRAWING AND CUTTING STOCK

Filed Sept. 18, 1933   2 Sheets-Sheet 2

Inventor:
Conrad Thyssen
per
Attorney.

Patented Aug. 14, 1934

1,970,205

UNITED STATES PATENT OFFICE 1,970,205

MACHINE FOR DRAWING AND CUTTING STOCK

Conrad Thyssen, Aachen, Germany, assignor to Schumag Schumacher Metallwerke Aktiengesellschaft für Prazisionsmechanik, Aachen, Germany Application September 18, 1933, Serial No. 690,015
In Germany May 13, 1932

3 Claims. (Cl. 29—33)

This invention relates to automatic rod drawing and cutting machines of the kind comprising oppositely reciprocating drawing carriages for effecting a continuous uniform drawing of the rods and a reciprocating cutting mechanism adapted to move with the rod at a given moment and cut the same into predetermined lengths.

The known machines of this kind have complicated mechanisms for operating the drawing and cutting carriages and the articles under treatment are frequently injured by the clamping or holding means of the drawing carriages, especially if a great force has to be applied for effecting the drawing.

The invention has for its object to provide a machine of the character stated which allows of a continuous uniform drawing of the rods without any danger of the rods being injured, simple machinery elements being used for operating the drawing and cutting carriages, securing a reliable and accurate uninterrupted working of the machine without regard to the amount of tractive force to be applied for the proper drawing of the work.

Figure 1B:
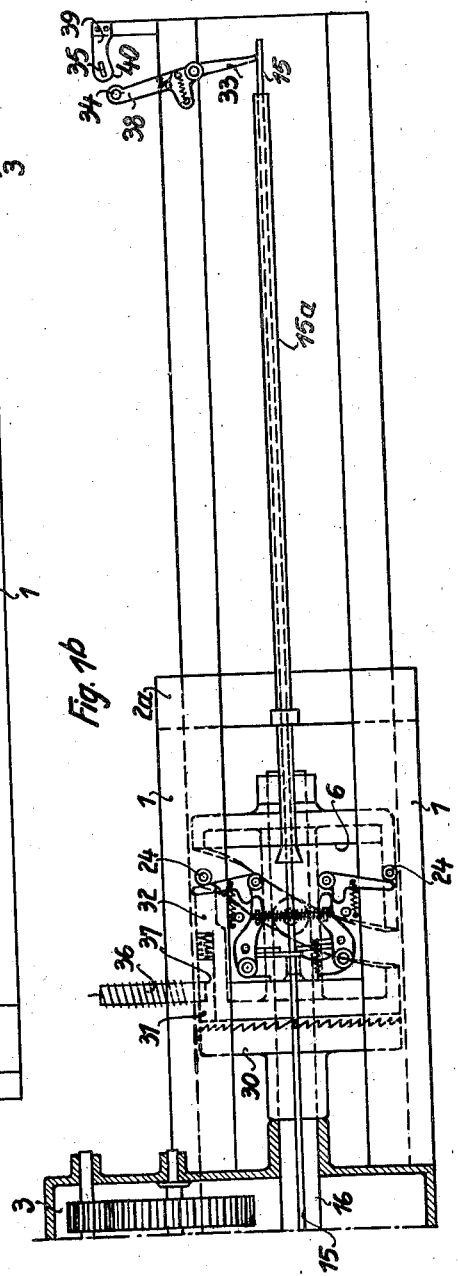
Figure 3:
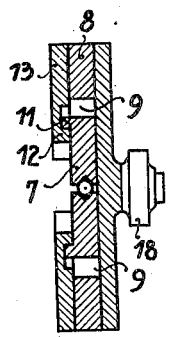
Figures 2, 7:
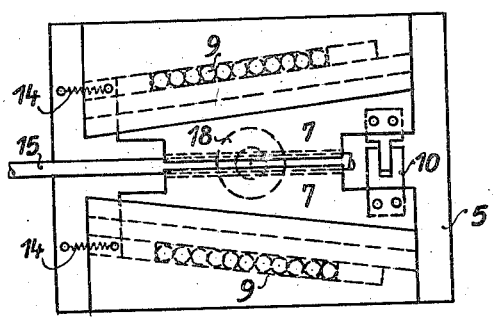
Figure 8:
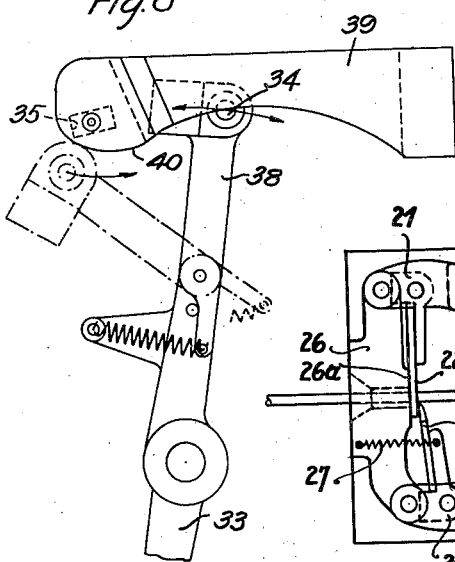
Figure 4:
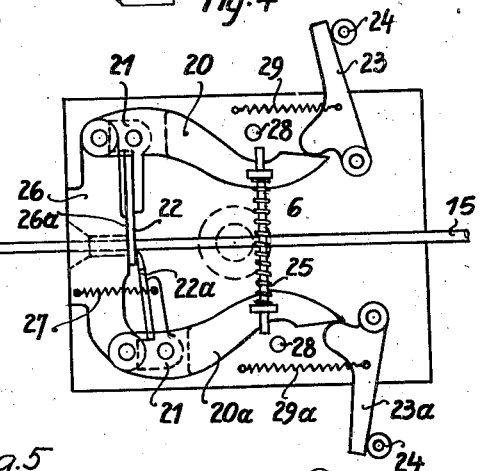
Figure 5:
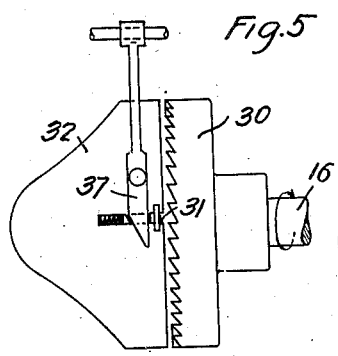
Figure 6:
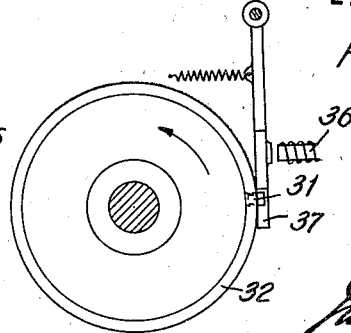

An embodiment of a machine according to the invention is illustrated in the accompanying drawings, in which Fig. 1ᵃ is a plan view of one portion and Fig. 1ᵇ a similar view of the complemental portion of the machine, Fig. 2 is a plan view of a drawing carriage, Fig. 3 a cross-section of this carriage, Fig. 4 a plan view of a carriage with the cutting mechanism, the Figures 2 to 4 being on a somewhat larger scale. Fig. 5 is a detail side elevation of the coupling and its actuating mechanism for the cutting carriage, Fig. 6 is an end view thereof, Fig. 7 is a sectional view from below of the automatic switch controlling the coupling of the cutting carriage, and Fig. 8 is a side elevation of this switch.

In Figs. 1ᵃ⁻ᵇ, 1 is a carriage bed which is fixed on standards 2 and 2a as well as to a gear box 3. Mounted on the standard 2 in a well-known manner is the die 4. The bed 1 carries two drawing carriages 5 and 5a as well as a carriage 6 on which the cutting mechanism is mounted. The drawing pliers on the carriages 5 and 5a are of a construction known per se, comprising a wedge-shaped casing with shiftable wedge-jaws 7, Figs. 2 and 3.

The wedge-jaws 7 bear with their inclined faces against correspondingly inclined faces of wedge-rails 8 through the intermediary of relatively long series of rollers 9. Slidably interengaging connecting members 10 hold the wedge-jaws 7 against relative longitudinal displacement. The jaws 7 are guided parallelly to the wedge-rails 8 by ribs 11 which are engaged by ribs 12 of a covering plate 13. Springs 14 draw the jaws into the wedge casing in such a manner that the jaws will always apply with a certain pressure against the rod 15 to be drawn. As the frictional resistance between the jaws and the rod is greater than the resistance between the jaws and the rollers 9, the drawing resistance at the rod causes both jaws 7 to be drawn tightly into the wedge casing and the rod to be strongly clamped between the jaws when the drawing carriage starts its forward movement, so that the rod will be drawn forward instantaneously in spite of the greatest drawing resistance. As the wedge-jaws are of a comparatively great length the pressure in clamping the rod to be drawn is distributed on a long piece and injury to the rod is thereby avoided. When the drawing carriage returns, the clamping engagement between the wedge-jaws and the rod causes the jaws to be held at rest for a moment or pushed a little back in the wedge casing, whereby the clamping action is instantaneously relieved so that the drawing carriage can return freely.

Arranged to extend below the carriage bed 1 parallel to the direction of drawing is a driving shaft 16 which is kept in continuous rotation during the operation of the machine through the toothed wheel gearing mounted in the box 3. The shaft 16 carries two cup-shaped cam discs 17 and 17a. These cam discs are in engagement with rollers 18 and 18a of the drawing carriages 5 and 5a and are designed to produce the advance movement of these carriages. Each disc has a uniformly ascending advance path extending through an angle of 180 degrees or a little more and a return path occupying 180 degrees or less. The drawing carriages 5 and 5a are positively returned by cam discs 19 and 19a. However, the returning of the carriages may also be effected by springs or weights. The two cam discs 17 and 17a are displaced 180 degrees relatively to each other on the shaft 16, so that the drawing carriages are alternately moved forth and back rythmically. As each of the uniformly ascending advance paths of the cam discs 17 and 17a extends through an angle of at least 180 degrees, one of the drawing carriages will already have started its uniform advance movement at the time the other carriage will terminate its advance. Therefore, a continuous uniform drawing of the rod is attained by simple means.

During the continuous drawing of the rods at a uniform speed, the cutting to the desired lengths can take place in any stage of the operation of the machine by the cutting mechanism which is mounted on the carriage 6. In the operation of cutting this carriage is moved at the same speed and in the same direction as the rod 15 by a drive adapted to be intermittently thrown in and out.

The cutting mechanism mounted on the carriage 6 and illustrated in detail in Fig. 4, essentially comprises two levers 20 and 20a, to which knife holders with the knives 22 and 22a are pivotally connected at 21, and two angular levers 23 and 23a. When the carriage 6 is reciprocated the long arms of the levers 23 and 23a pass between two rollers 24 which are supported on the bed 1. In the advance movement of the carriage 6 the long arms of the levers 23 and 23a are forced rearwards so that the short arms of these levers move the knife levers 20 and 20a towards each other. As soon as the levers 23 and 23a during the further advance of the carriage 6 have moved beyond the rollers 24, they jump into their initial position together with the knife levers 20 and 20a through the pressure of a spring 25. When pressing the levers 20 and 20a together the knives 22 and 22a are pushed transversely to the rod 15 for cutting it through. In this transverse shifting movement the knife 22 is guided by a flat surface portion 26a of a rod guiding member 26. The knife 22a has an inclined position to the direction of the transverse shifting movement and its blade is held in contact with the knife 22 by a spring 27. The inoperative position of the knife levers 20 and 20a is determined by stop pins 28 and 28a, against which the said levers are pressed rather strongly by the spring 25, while the levers 23 and 23a in their inoperative position bear only lightly with their short arms on the knife levers 20 and 20a under the weak pull of springs 29 and 29a. The levers 23 and 23a are thereby allowed to deflect freely between the rollers 24 in the return movement of the carriage without influencing the knife levers.

The intermittent throwing in and out of the drive for the carriage 6 can be effected by an ordinary ratchet tooth coupling, the driven member of which is stopped in a known manner after each revolution in the same position of rotation. The driving member 30 of the coupling provided with a toothed rim is rigidly connected with the constantly rotating shaft 16. The driven member 32 which is provided with a controllable ratchet tooth 31 is formed as a cup-shaped cam disc idly mounted on the shaft 16. At each revolution of this cup disc the carriage 6 with the cutting mechanism is reciprocated once and a drawn rod cut off during each reciprocation. As the pitch of the advance path of the cam disc 32 corresponds to that of the cam discs 17 and 17a, the carriage 6 with the cutting mechanism will be advanced with exactly the same speed as the rod 15.

The control of the ratchet tooth 31 for obtaining the cutting-off of predetermined lengths of rods may take place purely mechanically or by the aid of electric current, as indicated diagrammatically in Fig. 1b, and shown in detail in Figs. 5 to 8, inclusive. In the embodiment illustrated, the rod 15 when drawn to a predetermined length strikes against a contact lever 33 and deflects it. The lever 33 carries an insulated contact 34 adapted to engage and close a pair of spaced contacts 35 of the circuit of the magnet 36 which serves to operate the actuating lever 37 of the ratchet tooth 31. The contact 34 is mounted in a pivotal arm 38 of the lever 33, while the contacts 35 are mounted at the ends of the resilient blades 39 in insulating blocks 40. The blades 39 are bent as shown in Fig. 7 so that their ends are at a closer distance than their main portions. The pivotal arm 38 with the contact 34 normally stands between the blades 39 as can be seen from Figs. 7 and 8. When the lever 33 is hit by the rod 15 the lever 33 with its arm 38 is swung forward, its upper end which is pointed at the forward edge being pressed through between the ends of the resilient blades 39 which are thereby spread apart. During this movement the contact 34 slides along the contacts 35 and closes the circuit of the magnet 36. The circuit is broken again when in the continued forward movement of the lever 33 its upper end with the contact 34 emerges from between the contacts 35 which resume then their normal position, Fig. 7. When the lever 33 swings back, its upper end cannot enter between the contacts 35 but the arm 38 is tilted about its pivot against the action of a spring and slides along the lower edges of the blocks 40 until it comes below the wide-spaced portions of the blades 39, where it will again take its initial position between the blades, as will be clearly understood from Figs. 7 and 8.

The ratchet tooth 31 is guided in a groove of the coupling member 32 parallel of the axis of the shaft 16 and is under the action of a spring tending to force the tooth into engagement with the toothed rim of the coupling member 30. The tooth 31 has a portion projecting beyond the surface of the member 32 and possesses in this portion a recess which is adapted to be engaged by the wedge-shaped end of the lever 37. This lever is under the action of a spring which tends to force it into engagement with the ratchet tooth, while this spring force can be overcome and the lever 37 disengaged from the tooth 31 by the magnet 36. In the position shown in Figs. 5 and 6, the tooth 34 is held withdrawn by the lever 37 so that the coupling members 32 and 30 are disengaged, the member 32 being at rest. As soon as the lever 37 is attracted by the magnet 36, it releases the tooth 31 and allows same to snap into engagement with the toothed rim of the member 30 coupling the latter with the member 32. Both members 30 and 32 now rotate in unison. After the cam disc or coupling member 32 has started its rotation and the tooth 31 come out of the range of the lever 37, the magnet 36 releases the lever 37 again as its circuit remains only closed at 35 for a very short time. The released lever 37 swings into its initial position and shortly before the disc 32 completes one revolution the tooth 31 is re-engaged by the wedge-shaped end of the lever 37 and withdrawn from the teeth of member 30, so that disc 32 will automatically come to rest again after exactly one revolution.

The rod 15 can be guided between the cuting mechanism and the contact lever 33 in a tube 15a. When using such a tube, the rod when cut off must be conveyed ahead by rollers or other means in the drawing direction at an increased speed for allowing the contact lever 33 to swing back before the next rod reaches it. The guide can also be so arranged that the rods cut-off can be pushed away laterally or drop down.

Having thus described my invention, what I claim as new and desire to secure by Letters Patent is:—

1. An automatic machine for drawing and cutting off metal rods and the like, comprising a bed, a pair of successive spaced drawing carriages mounted for alternate to and fro movement on the said bed in opposite directions, a driving shaft parallel to the line of drawing, a cam disc fast on the driving shaft below each of the two drawing carriages in operative engagement therewith for producing the advance movement of the carriages, these cam discs being displaced 180 degrees relatively to each other on the shaft and having each a helical advance path of the same pitch extending through an angle of at least 180 degrees, means for returning the drawing carriages to their initial position after the termination of each advance stroke, and a cutting mechanism for severing the work into predetermined lengths adapted to be advanced with the work at the drawing speed in any stage of the drawing operation through a drive actuated by the driving shaft and adapted to be thrown in and out.

2. An automatic machine for drawing and cutting off metal rods and the like, comprising a bed, a pair of successive spaced drawing carriages mounted for alternate to and fro movement on the said bed in opposite directions, a driving shaft parallel to the line of drawing, a cam disc fast on the driving shaft below each of the two drawing carriages in operative engagement therewith for producing the advance movement of the carriages, these cam discs being displaced 180 degrees relatively to each other on the shaft and having each a helical advance path of the same pitch extending through an angle of at least 180 degrees, means for returning the drawing carriages to their initial position after the termination of each advance stroke, a cutter carriage likewise mounted for to and fro movement on the bed of the machine in rear of the drawing carriages, a cam disc of a similar configuration as the aforesaid cam discs idly carried by the common driving shaft below the cutter carriage in operative engagement with the same, means for coupling the said cam disc with the shaft for revolving it and imparting through it an advance movement to the cutter carriage with the work, and means for returning the cutter carriage to its initial position.

3. An automatic machine for drawing and cutting off metal rods and the like, comprising a bed, a pair of successive spaced drawing carriages mounted on this bed for alternate movement towards and away from each other, work gripping pliers on the drawing carriages including each a pair of cooperative shiftable jaws of wedge-shaped configuration, means for yieldingly forcing the jaws by one of their faces into firm engagement with the work and series of rollers on which the jaws slide by their opposite faces, a driving shaft parallel to the line of drawing, a cam disc fast on the driving shaft below each of the two drawing carriages in operative engagement therewith for producing the advance movement of the carriages, these cam discs being displaced 180 degrees relatively to each other on the shaft and having each a helical advance path of the same pitch extending through an angle of at least 180 degrees, means for returning the drawing carriages to their initial position after the termination of each advance stroke, and a cutting mechanism for severing the work into predetermined lengths adapted to be advanced with the work at the drawing speed in any stage of the drawing operation through a drive actuated by the driving shaft and adapted to be thrown in and out.

CONRAD THYSSEN.